(12) United States Patent
Bromley et al.

(10) Patent No.: US 9,875,029 B2
(45) Date of Patent: Jan. 23, 2018

(54) NETWORK-ATTACHED STORAGE ENHANCEMENT APPLIANCE

(71) Applicant: Parsec Labs, LLC, Maple Grove, MN (US)

(72) Inventors: Graham Bromley, Dublin, CA (US); Walter Angerer, Maple Grove, MN (US); Richard Bromley, Dublin, CA (US); Kirk Clowser, Dellwood, MN (US); Jon Genda, Rogers, MN (US)

(73) Assignee: Parsec Labs, LLC, Maple Grove, MN (US)

(*) Notice: Subject to any disclaimer, the term of this patent is extended or adjusted under 35 U.S.C. 154(b) by 0 days.

(21) Appl. No.: 15/391,286

(22) Filed: Dec. 27, 2016

(65) Prior Publication Data
US 2017/0109053 A1    Apr. 20, 2017

Related U.S. Application Data

(63) Continuation of application No. 14/490,911, filed on Sep. 19, 2014, now abandoned.
(Continued)

(51) Int. Cl.
| | |
|---|---|
| *G06F 3/06* | (2006.01) |
| *G06F 17/30* | (2006.01) |
| *H04L 12/24* | (2006.01) |
| *H04L 29/08* | (2006.01) |
| *H04L 29/12* | (2006.01) |

(52) U.S. Cl.
CPC ............ *G06F 3/0607* (2013.01); *G06F 3/061* (2013.01); *G06F 3/0605* (2013.01); *G06F 3/067* (2013.01); *G06F 3/0608* (2013.01); *G06F 3/0629* (2013.01); *G06F 3/0641* (2013.01); *G06F 3/0649* (2013.01); *G06F 17/302* (2013.01); *G06F 17/30082* (2013.01);
(Continued)

(58) Field of Classification Search
None
See application file for complete search history.

(56) References Cited

U.S. PATENT DOCUMENTS

| | | |
|---|---|---|
| 3,168,723 A | 2/1965 | Foin et al. |
| 3,310,786 A | 3/1967 | B et al. |

(Continued)

FOREIGN PATENT DOCUMENTS

EP    0869439 A1    10/1998

OTHER PUBLICATIONS

Archlinux; SSD, LVM, Tiered storage—speeding up your storage—alpha version!; Forum, Feb. 14, 2011; https://bbs.archlinux.org/viewtopic.php?id=113529.
(Continued)

*Primary Examiner* — Sean D Rossiter
*Assistant Examiner* — Charles Choi
(74) *Attorney, Agent, or Firm* — Michael Dryja

(57) ABSTRACT

A network attached storage management appliance that can be inserted into a pre-existing network. The appliance sits between an end user and the available storage and optimizes performance and storage through acceleration of data, migration of data, compression of data, deduplication of data, and expansion of storage. The device moves data between lower- and higher-performance storage, with frequently accessed data sitting in higher-performance storage and infrequently accessed data sitting in lower-performance storage.

20 Claims, 6 Drawing Sheets

Related U.S. Application Data

(60) Provisional application No. 61/978,798, filed on Apr. 11, 2014.

(52) U.S. Cl.
CPC ...... *H04L 41/0893* (2013.01); *H04L 61/1582* (2013.01); *H04L 67/1097* (2013.01); *H04L 67/2852* (2013.01)

(56) References Cited

U.S. PATENT DOCUMENTS

| | | | |
|---|---|---|---|
| 5,586,290 | A | 12/1996 | Hirai et al. |
| 5,815,096 | A | 9/1998 | Smith |
| 5,822,780 | A | 10/1998 | Schutzman |
| 5,983,368 | A | 11/1999 | Noddings |
| 6,721,841 | B2 | 4/2004 | Fukuzawa et al. |
| 6,850,959 | B1 | 2/2005 | Golds |
| 7,853,667 | B1 | 12/2010 | Yoder |
| 7,996,708 | B1 | 8/2011 | Mohl |
| 8,046,555 | B2 | 10/2011 | Hara et al. |
| 8,073,674 | B2 | 12/2011 | Gehr et al. |
| 8,195,876 | B2 | 6/2012 | Van Hise et al. |
| 8,296,398 | B2 | 10/2012 | Lacapra et al. |
| 8,335,915 | B2 | 12/2012 | Plotkin et al. |
| 8,356,072 | B1 | 1/2013 | Chakraborty et al. |
| 8,359,430 | B1 | 1/2013 | Fair |
| 8,380,929 | B2 | 2/2013 | Augenstein et al. |
| 8,397,016 | B2 | 3/2013 | Talagala et al. |
| 8,499,121 | B2 | 7/2013 | Tolia et al. |
| 8,583,868 | B2 | 11/2013 | Belluomini et al. |
| 8,601,473 | B1 | 12/2013 | Aron et al. |
| 8,874,628 | B1 | 10/2014 | Lanzatella et al. |
| 2003/0037127 | A1 | 2/2003 | Shah et al. |
| 2004/0011213 | A1 | 1/2004 | Kwon et al. |
| 2005/0246386 | A1 | 11/2005 | Sullivan et al. |
| 2006/0101204 | A1 | 5/2006 | Bao |
| 2006/0242212 | A1 | 10/2006 | Brinkmann et al. |
| 2007/0139518 | A1 | 6/2007 | Chang |
| 2007/0220029 | A1 | 9/2007 | Jones et al. |
| 2007/0266108 | A1 | 11/2007 | Patterson et al. |
| 2008/0307178 | A1 | 12/2008 | Agombar et al. |
| 2011/0213755 | A1 | 9/2011 | Kavuri et al. |
| 2012/0173596 | A1 | 7/2012 | Slik et al. |
| 2013/0041977 | A1 | 2/2013 | Wakamiya |
| 2013/0073717 | A1 | 3/2013 | Collin et al. |
| 2013/0138891 | A1 | 5/2013 | Chockler et al. |
| 2013/0318210 | A1 | 11/2013 | Lent et al. |
| 2014/0006357 | A1 | 1/2014 | Davis et al. |
| 2014/0025909 | A1 | 1/2014 | Naor et al. |
| 2014/0098662 | A1 | 4/2014 | Jungck et al. |
| 2014/0195496 | A1 | 7/2014 | Yadav et al. |

OTHER PUBLICATIONS

IBM Corporation; IBM 3850 mass storage system; Article; Oct. 9, 1974; http://www-03.ibm.com/ibm/history/exhibits/storage/storage_3850_html.

IBM Corporaton; Tivoli Storage Manager; Article; Oct. 2012; http://www-03.ibm.com/software/products/en/tivostormana.

IBM Corporation; High Performance Storage System; website; 1992; http://www.hpss-collaboration.org.

EMC Corporation; EMC DiskXtender for Windows; data sheet. dated Aug. 2008.

Novell; Dynamic Storage Technology; website; dated 2011; https://novell.com/products/openenterpriseserver/features/dynamic-file-storage.html.

Moonwalk Inc.; Technology; website; 1980; http://moonwalkinc.com/product-overview/.

Oracle; Sun QFS and Sun Storage Archive Manager 5.0 documentation; copyright 2011.

Versity; Cray Expands Data Management Portfolio with New Tiered Adaptive Storage Solution; website; Nov. 6, 2013; http://www.versity.com/cray-expands-data-management-portfolio-new-tiered-adaptive-storage-solution.

Compellent; Data Progression data sheet; copyright 2011.

Zarafa; Zarafa Archiver, Article; Jun. 26, 2011; http://download.zarafa.com/zarafa/brochures/20110626%20Zarafa%20Archiver%201.0_web.pdf.

SUSE; SUSE Linux Enterprise Server 12, Article; 1992; https://www.suse.com/products/server/features.

QStar Technologies; QNM—QStar Network Migrator; Article; 2012; http://www.qstar.com/download/qstar_network_migrator.pdf.

Apple Inc.; Mac Mini (Late 2012 and later, iMac (Late 2012 and later): About Fusion Drive; Article; Oct. 23, 2012; http://support.apple.com/en-us/HT202574.

Microsoft; Storage Spaces Overview; Article; Jan. 2, 2013; http://social.technet.microsoft.com/wiki/contents/articles/15198.storage-spaces-overview.aspx.

NETAPP; NetApp Unveils Clustered Data ONTAP Innovations that Pave the Way for Software-Definte Storage; News Article; Jun. 11, 2013; http://www.netapp.com/us/company/news/press-releases/news-rel-20130611-574523.aspx.

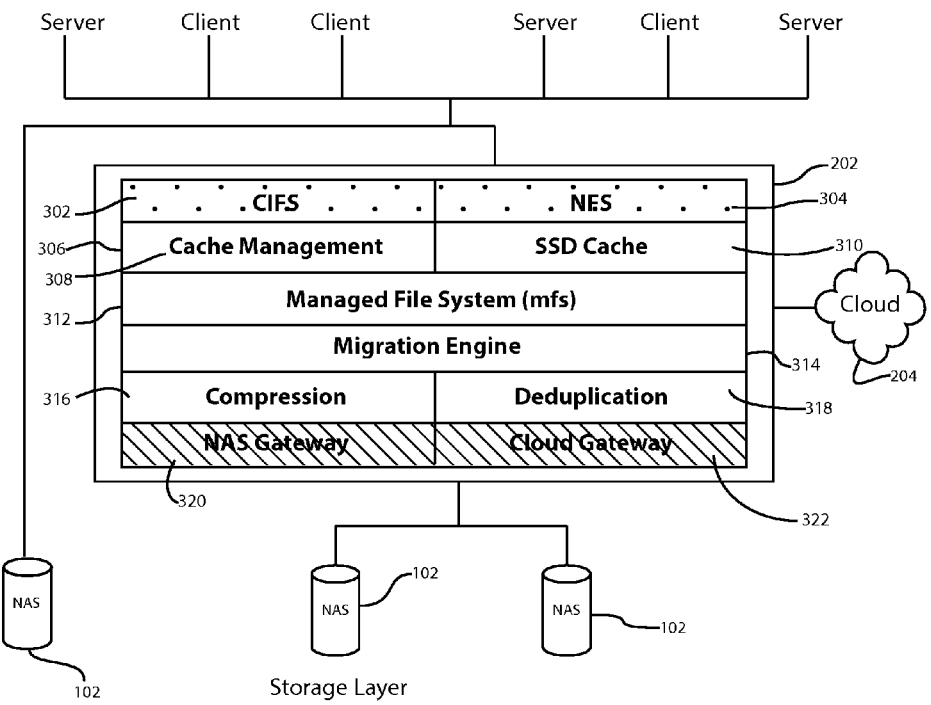
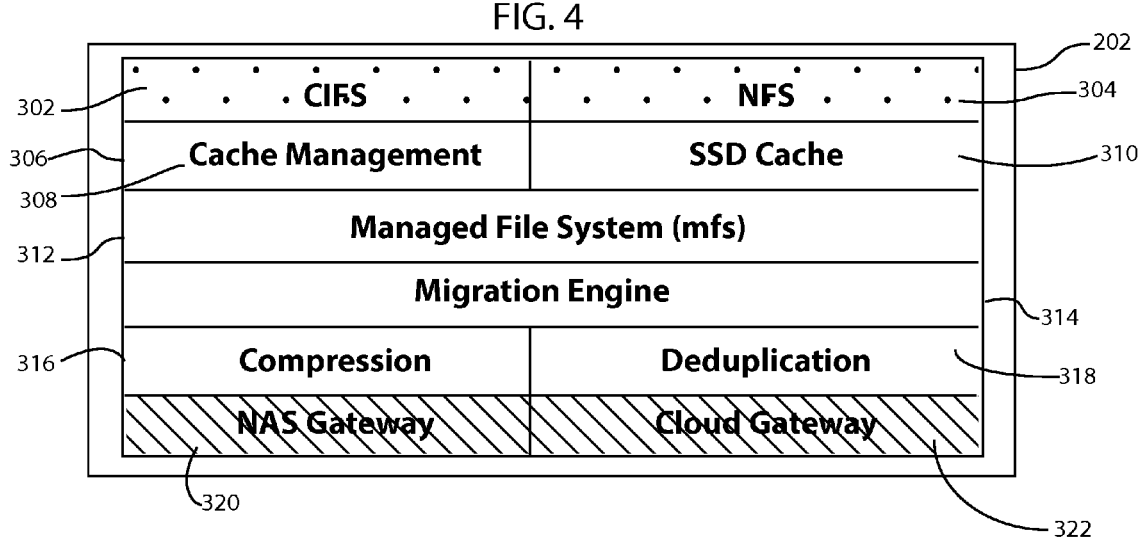

NETWORK-ATTACHED STORAGE ENHANCEMENT APPLIANCE

CROSS-REFERENCE TO RELATED APPLICATIONS

This application claims the benefit of U.S. Provisional Application No. 61/978,798, filed Apr. 11, 2014, titled NETWORK-ATTACHED STORAGE ENHANCEMENT APPLIANCE.

FIELD OF THE DISCLOSURE

The present invention generally relates to a network-attached storage (NAS) enhancement appliance that can enhance performance and utility of a user's NAS. More specifically, it can optimize storage functions. By optimizing storage function, the present invention can accelerate access speed to data in NAS storage, expand storage of data without interrupting service, and reduce consumption of NAS storage.

BACKGROUND OF THE INVENTION

The data storage industry is at a crossroads. Storage needs are expanding at a rapid pace, making it difficult for businesses to keep up with the growing demands. In many cases, the amount of data stored is doubling every two years—filling up recently installed storage devices and making it difficult to serve the data at the performance level expected. Data centers are filling up, running out of storage, and often continue to add more disk to existing systems that are already bogged down by increased traffic and demands for faster operations.

The current approach of frequently replacing existing NAS with a next generation device is not only very costly to an enterprise, but also generates significant work for IT professionals who must manage migration of data from the "old" NAS device to the new, faster and bigger, NAS devices. Adding space-saving features, such as deduplication or compression, furthers slow performance. Adding solid-state drives (SSDs) allows for better performance, but does not solve the space issue and substantially increases cost. Cloud storage by itself solves for the space issue, but provides markedly lower performance and is not a panacea in terms of cost due to per-megabyte access and storage charges.

In addition to the above practical issues, replacing existing NAS can often mean an upfront cost of over $20,000 plus ongoing maintenance. On top of that initial capital expense comes the labor cost involved in migrating the existing data off the existing NAS onto the new NAS device and then reconfiguring every client to point to the new repository, together with the associated service disruption to users of the reconfigured storage. Furthermore, storage administrators often do not have the time or expertise to implement the newest solutions, exacerbating the already difficult situation. The labor required in adding more rack space, power, and cooling, as well as migrating the existing data is often overlooked, adding to their workloads in time and cost.

Further, migration technologies of the HSM form (Hierarchical Storage Management) typically migrate only whole files, and migration is based on file system free space. As the file system fills up, files are migrated and the file inode is modified to point to the current location of the migrated content. HSM is implemented inside the file system (typically kernel-resident) and is specific to that file system type.

SUMMARY OF THE INVENTION

The present disclosure relates to a network-attached storage (NAS) enhancement appliance that can enhance performance and utility of a user's NAS by means of distinct storage optimization functions such as accelerated access to NAS storage, storage expansion without service interruption, data migration to lower- or higher-performance storage and media, file system relocation, and reduction of consumption of NAS storage via file compression and deduplication.

Various embodiments will be described in detail with reference to the drawings, wherein like reference numerals represent like parts and assemblies throughout the several views. Reference to various embodiments does not limit the scope of the claimed invention. Additionally, any examples set forth in this specification are not intended to be limiting and merely set forth some of the many possible embodiments for the described invention. It is understood that various omissions and substitutions of equivalents are contemplated as circumstances may suggest or render expedient, but these are intended to cover applications or embodiments without departing from the spirit or scope of the claimed invention. Also, it is to be understood that the phraseology and terminology used herein are for the purpose of description and should not be regarded as limiting.

BRIEF DESCRIPTION OF THE DRAWINGS

FIG. 3 illustrates a system overview of the disclosed invention.
FIG. 4 illustrates a software overview of the disclosed invention.

DETAILED DESCRIPTION

Figure 1:
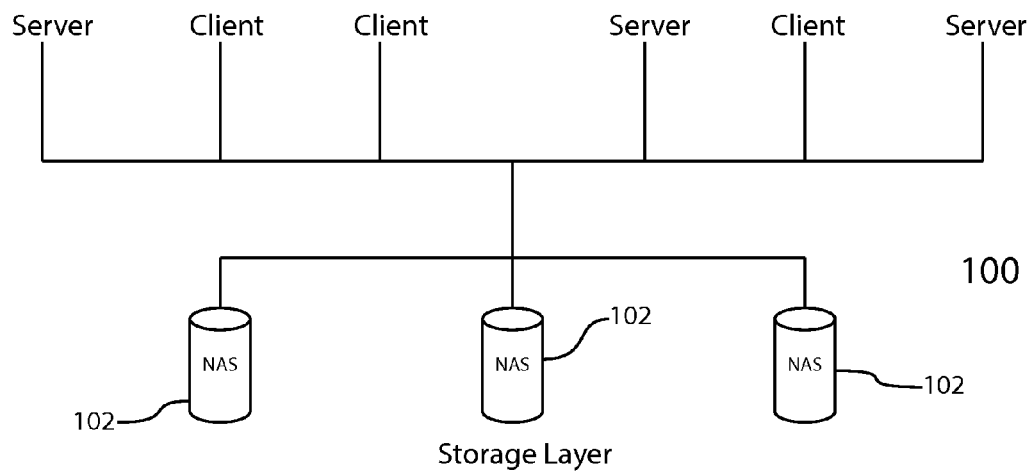
FIG. 1 illustrates a current network system.

Various user interfaces and embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims. It is understood that various omissions and substitutions of equivalents are contemplated as circumstances may suggest or render expedient, but these are intended to cover application or embodiments without departing from the spirit or scope of the claims attached hereto. Also, it is to be understood that the phraseology and terminology used herein are for the purpose of description and should not be regarded as limiting.

In general terms, the disclosed invention relates to a network-attached storage (NAS) enhancement appliance 202 that can be inserted on a user's local area network (LAN) and interposed between NAS clients and NAS servers, and between cloud storage clients and cloud storage 204.

Figure 2:
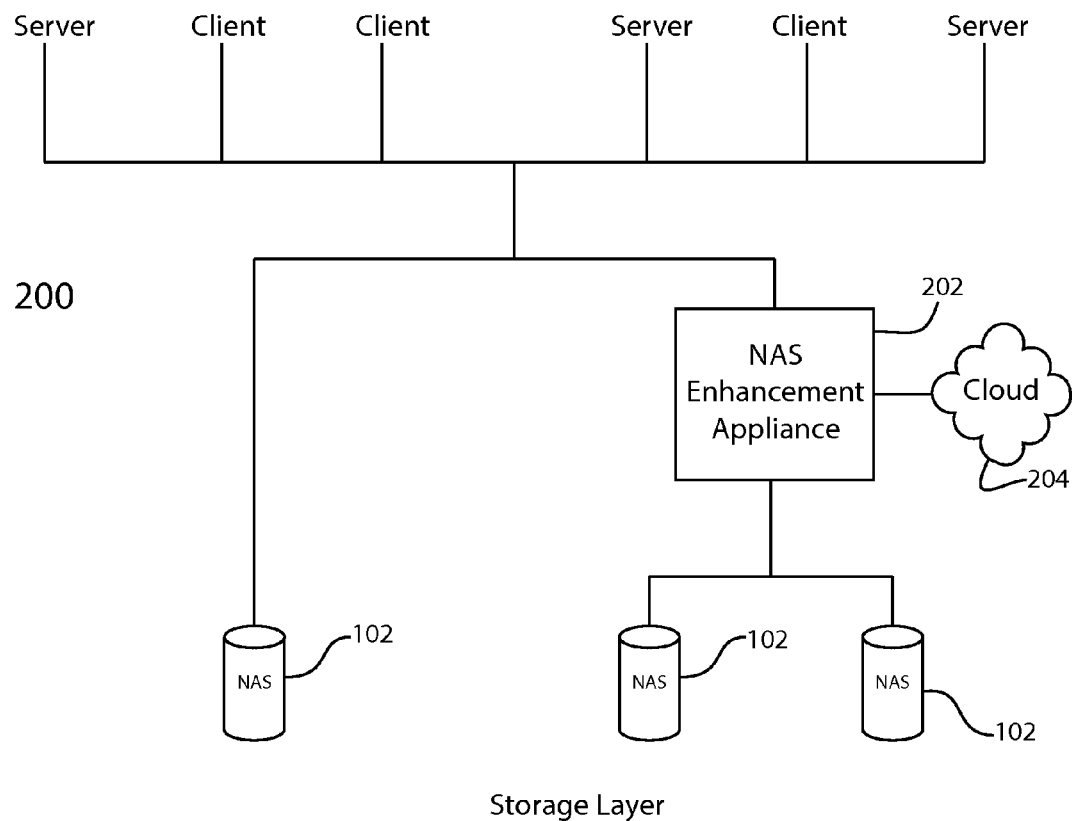
FIG. 2 illustrates a system overview of the disclosed invention.

Current network systems 100 use a network to connect clients or servers to NAS 102, as illustrated in FIG. 1. Different examples of servers include, but are not limited to, a web-server, email, database, etc. According to a first aspect of the present invention, there is a provided a hardware and software solution, as illustrated in FIGS. 2 through 4, arranged to provide a NAS enhancement appliance 202 that can be inserted into the current network system 100 to greatly enhance the performance and efficiency of existing storage hardware (resulting in cost savings) while adding several distinct storage optimization features that address performance and space:

Acceleration—Acceleration reduces latency and increases burst throughput to NAS 102 by means of cache storage in the NAS enhancement appliance 202. This results in reduced latency and improved I/O operations. Acceleration is especially beneficial for database and virtual machine performance.

Expansion—Expansion allows a managed file system to overflow to newly added storage without service interruption or complicated configurations/migration steps. Also, newly added storage that serves as an expansion target, can receive overflow data from multiple managed file systems.

Migration—Migration allows infrequently accessed data to automatically migrate to lower-cost, lower-performance storage, increasing available capacity for more frequently accessed data, with automatic retrieval to higher-performance media when appropriate. This enables optimal exploitation of storage media according to cost. Inactive data can be automatically stored in the Cloud 204, while active or "hot" data can be stored on the device in high-performing SSD. The NAS enhancement appliance 202 as envisioned herein allows the admin to control migration at the file level, with files included or excluded from the migration list based on any of the various attributes of a file. This includes but is not limited to attributes such as size, owner, recency of access, recency of update, type (file extension). This could be extended to include non-native attributes of a file, that is, attributes determined from the file content by the NAS enhancement appliance 202, rather than metadata attributes of the file as indicated by the file system. For example, presence of a certain keyword in file content as discovered by a search program could generate a migration list.

Compression 316 and Deduplication 318—Compression 316 reduces consumption of NAS 102, significantly increasing available space. Deduplication 318 reduces storage usage by taking chunks of data and comparing them to all other data that has already been stored. If a match is found, a pointer to the previously stored chunk is written instead of the data itself, reducing overall capacity.

Hybrid Cloud—Cloud 204 back-end allows storage of large volumes of inactive data—potentially endless storage. Data is moved automatically and transparently from the NAS 102 to the cloud 204 to free space. In addition, a user can maintain full policy control.

File System Relocation—this operating mode allows the network administrator to migrate a file from its current storage location to a new storage location, while the file system is active. There is no need to suspend access to the file system by application while relocation is occurring, a key requirement for businesses that require 7×24 access to stored data. This mode is also known as 'decommissioning' as it is typically used to allow the administrator to migrate file systems to new, higher performance storage, allowing the original storage to be taken offline once file system relocation is complete. File system relocation differs from migration in that the source data is not removed even when a source block has been copied to the relocation target. Until the source file system is taken offline (or decommissioned) it remains exactly up to date with respect to writes. Once file system relocation is complete, and until the source is decommissioned, the source and target effectively constitute a mirror.

Figure 9:
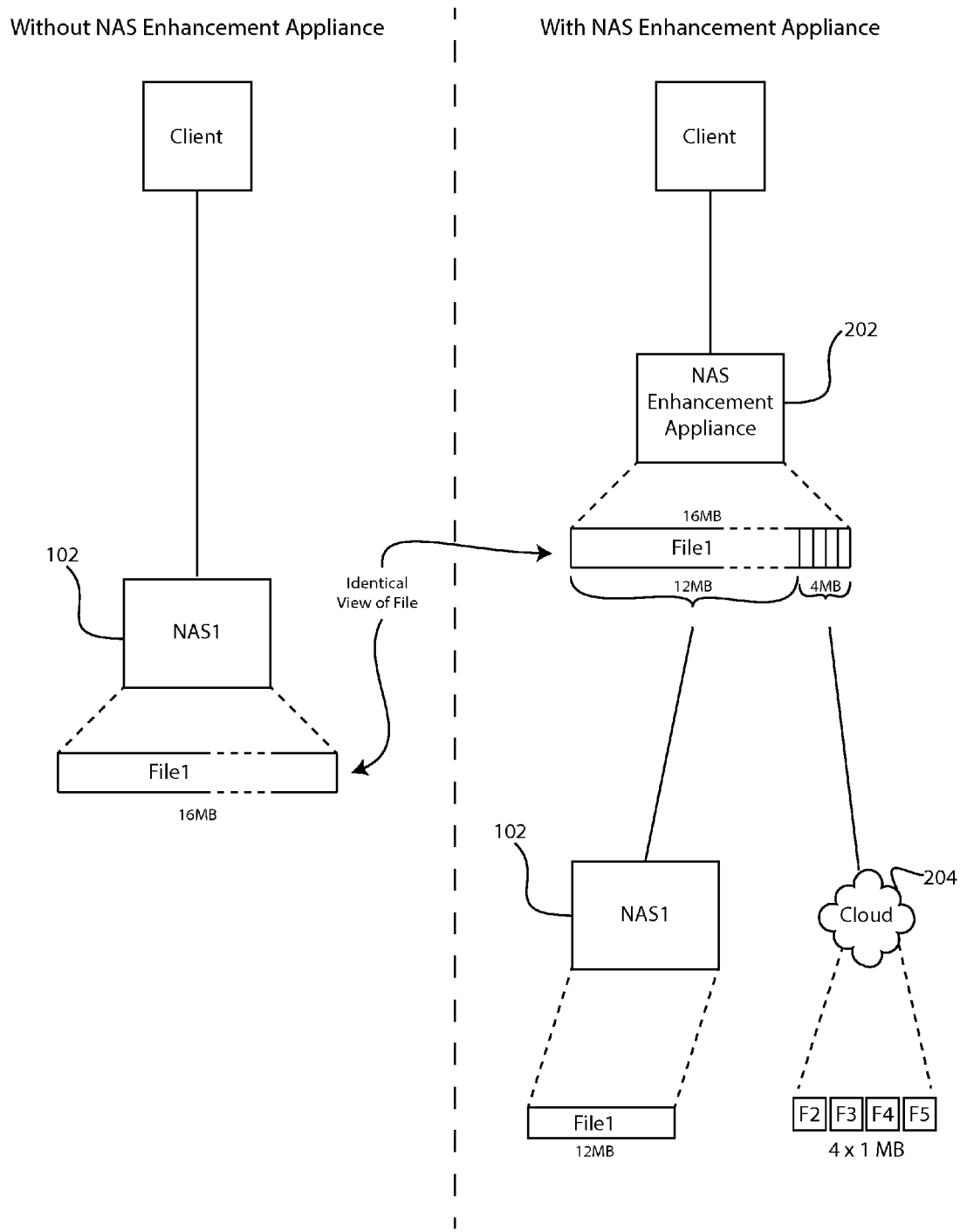
FIG. 9 illustrates a comparison of storage with and without the disclosed invention.

In one embodiment, these features allow acceleration of existing NAS 102, reduce storage requirement (current NAS 102 will last longer), and allow for potentially infinite storage through intelligent migration to the Cloud 204. A comparison between current storage methods and one embodiment of the disclosed NAS enhancement appliance 202 is illustrated in FIG. 9.

In another aspect of the present invention, the NAS enhancement appliance 202 also facilitates more control of data with a global policy engine deployed across storage and clients. Storage administrators will be free of the constraints of a difficult to manage system—no reconfiguration is required; deployment is transparent to all clients. Data transparently overflows to expansion storage as needed, and transparently migrates to and from its optimal storage location as determined by the relevant migration policies. The namespace and server identity of a managed NAS file system are preserved; there is no need for the admin to move files, which would cause file path changes and require reconfiguration of applications that access the file system.

Classical HSM also preserves the file system namespace as files are migrated, because a migrated file continues to be accessed through its original path. However, HSM is implemented internally to the file system (because the file inode structure is modified) and is therefore file system specific. If a user's data is distributed across a mixture of file system types, only part of the data will be amenable to migration.

The NAS enhancement appliance 202 can be implemented externally to managed file systems and is completely file system agnostic. To illustrate the significance of this: NAS enhancement appliance 202 can allow file systems to be migrated whether they reside in SSD or disk, where SSD typically requires a different file system type than many disk file systems, due to the particular requirements that SSD imposes on file system implementation. The NAS enhancement appliance 202 can migrate file content between different media and file system types without hindrance.

Putting a file system under control of the disclosed NAS enhancement appliance 202 is non-disruptive to applications. Therefore, the NAS enhancement appliance 202 can manage all of the acceleration, compression 316, file system expansion, data migration and file system relocation with a cloud 204 back-end automatically, with no disturbance to the clients.

The addition of cloud storage 204 supports long-term archiving, backup, and disaster recovery (DR). This permits restores from another server or from the Cloud 204, providing assurance of the security of data in case of equipment failure.

In another embodiment, the NAS enhancement appliance 202 disclosed herein can permit migration of partial file content. Migration technologies typically migrate entire files, possibly with the additional constraint that the file must be closed (no open file handles) while migration occurs. Further, some migration technologies, such as email server archival, are specific to a particular application and possibly application version, because migration must disassemble the file content to migrate it correctly. An email database may be contained in several large files whose format must understood in order to extract a specific message for migration to another location.

The NAS enhancement appliance 202 could be configured to migrate partial file content, of open files, without dependency on file format. This is important because server applications are usually long-lived (or even perpetual), with the subject files always open for update, and, file content differs widely between different servers. For example, a database tablespace file has a completely different format to an email server file. The NAS enhancement appliance 202 could also be enabled to migrate file content without concern for open file handles and file content. An additional advantage is the ability to migrate stale regions of a very large file, such as an email archive, where only a small fraction of the file is frequently accessed and therefore needs to remain on fast media.

Some Additional Benefits

Virtualize and Accelerate Existing NAS—Virtualize data and remove the boundaries between islands of individual NAS devices. Use of the NAS enhancement appliance 202 and existing NAS 102 will perform better than the most expensive state-of-the-art NAS 102. In one embodiment, the NAS enhancement appliance 202 can offer an average of 6X faster I/O.

Simple Deployment and Management—The NAS enhancement appliance 202 can seamlessly integrate with the existing network, no changes are required on existing servers that access the storage.

Migration, Compression 316, and Deduplication 318—Can produce significant storage savings.

Cloud Play—Utilize cloud storage 204 as needed. Cloud storage 204 can serve as an expansion or migration target for file systems managed by the disclosed system.

Scalability—Scale to needs in cost and storage requirements, including through a subscription.

Definitions

The following are a list of terms and their descriptions. All defined terms appear in quotations only throughout the definitions. They are meant to provide additional information regarding the present invention but do not delimit the full scope of the invention.

The term "bin" refers to a unit of user storage under control of the NAS enhancement appliance 202 that serves as "expansion storage", "migration storage" or "relocation storage". It can be identified by host address and file system mount point. "Bin" may also be referred to as "storage bin."

The term "binID" refers to a part of an "object locator." The "binID" serves as a unique numeric identifier for an entry into the "bin table."

The term "bin table" refers to a table of all "storage bins," whether "expansion storage", "migration storage" or "relocation storage." Each entry in the bin table defines the resource identity (for example, server, access path), operation role (either expansion, migration or relocation), the "tier level" (for "migration storage"), and the "policyID" (for "migration storage"). "Managed file system (mfs) storage bins" are implicit and do not appear in the "bin table."

The term "cache manager" (CM) refers to the cache manager 306 of the NAS enhancement appliance 102. The "cache manager" 306 mediates movement in and out of the cache storage of the NAS enhancement appliance 202.

The term "cache storage" refers to storage within the NAS enhancement appliance 202 that facilitates acceleration but does not store persistent data. Data that is cached is written back to external storage, such as expansion storage or migration storage, as soon as possible.

The term "currentIP" refers to a reconfigured IP address of a NAS host after one or more of its file systems have been migrated or moved under control of the NAS enhancement appliance 202.

The term "chunking" refers to the process wherein a file larger than "MBLKSIZE" is broken into discrete "mblocks" during expansion or "migration." For a file larger than "PCHUNKSIZE," chunking occurs from end to beginning of the file, with the file being truncated as each successive "mblock" file is created. Each "mblock," except the last one, contains "MBLKSIZE" bytes. The last "mblock" contains the trailing part of the file. This process is described in further detail below.

The term "de-migration" refers to a process that can occur either when new data is written or when migrated data is read a certain minimum number of times. If new data is written, the corresponding "mblock" (if extant) is restored from its current location, which can be at any "tier level," to the "storage bin" with the highest "tier level" configured for the "mfs" 312, with the write overlaid on it. Similar relocation can occur if existing migrated data is read a certain minimum number of times. This process is described in further detail below.

The term "expansion" refers to a process wherein an "mfs" 312 expands when the file system overflows and new data is stored to configured "expansion storage."

The term "expansion storage" refers to an overflow receptacle for one or more "managed file systems." The term "mapping file" refers to a file that contains an "object locator" for each "mblock" of a chunked file. The "mapping file" can be indexed with file offset to identify the corresponding "object locator" and hence "mblock." An "object locator" describes each "mblock".

The term 'relocation' refers to the process of migrating an entire file system from its current location to a relocation storage bin, one file at a time. Each file is relocated block by block but is not chunked in the relocation storage bin. That is, a fully relocated file is stored as a single file, irrespective of file size.

The term "relocation storage" refers to a storage bin that is designated as a relocation target. A bin so designated is reserved as a relocation target for a single managed file system, and is not used for expansion or migration.

The term "fsck" refers to a file system check.

The term "host table" refers to a table that contains a mapping from the original IP address of a host to its current address. The original IP address is a virtual address of the NAS enhancement appliance 202 and is persisted to disk in the NAS enhancement appliance 202.

The term "flag" refers to a description of an object type such as, but not limited to, an mblock file, compressed mblock file, or mapping file.

The term "inode" refers to an index node.

The term "iptables" refers to a program that enables a user to configure tables using rules.

The term "link table" refers to a table that contains a mapping from "inumber" to "object locator" for a migrated file with multiple links. The "link table" can be stored under the root of an "mfs" 312.

The term "managed file system" (mfs) 312 refers to a file system under control of the NAS enhancement appliance 202. The namespace of the file system will be preserved and subsequently modified according to network file system (NFS) 304 operations against it. A managed file system can be accessed through a mount point in the NAS enhancement appliance 202.

The term "mblock" refers to a migration block or migration unit and is of maximum size "MBLKSIZE." "MBLKSIZE" refers to the "mblock" unit size that "migration" occurs in. It is the unit of expansion, migration and relocation between managed file systems and "storage bins." "MBLKSIZE" is much larger than the typical file system block. A file larger than "MBLKSIZE" is chunked before "migration." A file smaller than "MBLKSIZE" is migrated as-is and retains its original size. An "mblock" is stored as a file that contains only that "mblock," which is of maximum length "MBLKSIZE" irrespective of the type of target storage bin. The different types of storage may be SSD, HDD, cloud 204 file system, or tape file system.

The term "mfs storage bin" refers to the storage bin implicitly associated with an mfs 312. It is comprised of free space in the "mfs" 312 and does not appear in the "bin table." "Object files" can be stored to an "mfs storage bin" during compression 316 or "prechunking," that is, before expansion or migration has occurred. An "mfs storage bin" is not an expansion or "migration" target for other managed file systems. Therefore, only "object files" that relate to files in an mfs 312 can be stored in an "mfs storage bin."

The term "mfs table" refers to a table of all managed file systems, persisted to disk in the NAS enhancement appliance 202. Each entry contains "originalIP," "mountPoint," "currentIP," mount string, "policyID," cache name (if any), acceleration flag, compression flag, and zero or more storage bins as expansion, migration or relocation targets.

The term "migd" refers to a migration daemon. The "migd" synchronizes mapping file updates with "pxfs" through an ioctl system call mechanism.

The term "migration" refers to relocation of data from an mfs 312 or "migration storage" to down-tier "migration storage," according to the detailed description herein.

The term "migration policy" refers to the controls over relocation of data from an mfs 312 to "migration" target storage.

The term "migration storage" refers to storage associated with a tier level. Data can be migrated from an mfs 312 down-tier one level at a time.

The term "migration table" refers to a small regular file that contains a name and object locator of each perturbed file. It is located beneath each directory in an mfs 312 that contains more than a certain number of migrated files. A "migration table" points to perturbed files only in this directory. When the number of files migrated from a directory exceeds a limit, upon "migration" the migrated file's "object locator" is stored in the "migration table," instead of in a "stub file." This limits the number of stub files that could otherwise be created in a single file system due to migration.

The term "mountPoint" refers to the root of an mfs 312. An mfs 312 root is mounted on a directory in "MFS."

The term "object file" refers to a file created by the NAS enhancement appliance 202 in "storage bins." An "object file" can be either an "mblock" file or "mapping file."

The term "object locator" (objloc) refers to a unique identifier for an "object file" that is created by the NAS enhancement appliance 202. In one implementation, objloc is a 64-bit unsigned integer or 16 ASCII hex characters that identifies the target file, location, and type. Objloc can appear in "mapping files," "migration tables," and the "link table."

The term "originalIP" refers to the original IP address of a host before one or more of its file systems were moved under control of the NAS enhancement appliance 202.

The term "perturbed file" refers to an mfs 312 that has been partly or fully relocated.

The term "policyID" refers to an entry field in the "mfs table." The "policyID" serves as an index into the "policy table."

The term "policy table" refers to an indexed table of "migration policies." The "policy table" is indexed with the "policyID" obtained form an entry in the "mfs table." It contains "migration" parameters such as, but not limited to, owner, group, file type, minimum size, and most recent access date.

The term "prechunking" refers to a process wherein a file larger than the prechunk limit "PCHUNKSIZE" is chunked before migration occurs, to expedite migration when the file is actually selected for migration. "Prechunking" may help to reduce "migration" latency. If the file is larger in size and less frequently accessed, it is more likely to be eventually selected by the NAS enhancement appliance 202 for migration, and is therefore a suitable candidate for "prechunking."

The term "prechunk limit" refers to the minimum size for which prechunking occurs. In one embodiment, it is approximately five "mblocks."

The term "pxfs" refers to the FUSE implementation of the NAS enhancement appliance 202.

The term "pxlibs" refers to a set of libraries shared by multiple NAS enhancement appliance 202 components. These libraries can mediate access to migrated files and they can support "migration" operations.

The term "relocation" refers to the processes of expansion and "migration," and is a term used where both modes of data movement apply. Note that this is distinct from "file system relocation", which refers to the relocation of an entire file system.

The term "stub file" refers to a file that remains in an mfs directory when the number of files relocated from a directory is below a threshold. The "stub file" is contained in a newly created directory in the file's parent directory. In one implementation, the "stub file" is 24 bytes and contains an 8-byte magic number, 8-byte "object locator," and 8-byte checksum. The 24 bytes of data fit into the "stub file's" inode as inline data. However, if the number of relocated files exceeds the threshold, an entry is instead made in, for example, the "migration table."

The term "tier level" refers to an attribute of a migration "storage bin" that determines its position in the tier hierarchy for "migration."

The term "unperturbed file" refers to a file in an mfs 312 that has not been "relocated."

The abbreviation "BFS" refers to a file system in the disclosed NAS enhancement appliance 202 that provides access to all "storage bins." It contains a symlink to each directory that contains non-mfs "storage bins", and provides a convenient path through which to access all non-mfs storage bins.

The abbreviation "CBLKSIZE" refers to the unit size that acceleration occurs in. It is the unit size of the cache storage and can be configured as any power of two from 1K to 1M when the NAS enhancement appliance 202 is first initialized and remains fixed thereafter.

The abbreviation "CHDRSIZE" refers to the size of the cache block header. In one embodiment, the "CHDRSIZE" is 512 bytes.

The abbreviation "CIFS" refers to Common Internet File System 302.

The abbreviation "FUSE" refers to Filesystem in Userspace. "Pxfs" is a "FUSE" implementation.

The abbreviation "MFS" refers to a file system that provides access to the namespaces of all managed file systems. All managed file systems are mounted under "MFS," but "MFS" does not contain files other than directories on which managed file systems are mounted.

The abbreviation "NFS" refers to Network File System 304.

The abbreviation "PCHUNKSIZE" refers to the smallest size at which a file may be selected for pre-chunking In one implementation it is approximately five times larger than "MBLKSIZE."

The abbreviation "SDS" refers to Software Defined Storage. It is a storage-related functionality embodied in a software layer above physical storage, rather than embedded in storage.

General Description

In general, the disclosed NAS enhancement appliance 202 can be inserted into an existing network, as illustrated in FIGS. 2 and 3, in order to take current computer file storage and enable the storage to hold more files while, at the same time, permit the user to access those files through the original file system namespace even when files may have been relocated due to the processes of storage expansion, file migration, file de-migration, file compression 316, and access acceleration. Many storage types exist today, with some enabling faster access to files than others. For example, SSD is a higher performance storage option that permits faster file access than HDD. However, HDD is a less expensive storage option. Other storage types used today are cloud drives 204 and tape (LTFS).

The disclosed NAS enhancement appliance 202 can also facilitate storage decommissioning, by copying an active file system to a new location, concurrently with updates to the source file system, so that applications need not be taken offline while file system relocation is in progress.

In the disclosed NAS enhancement appliance 202, frequently accessed files can be kept on higher performance storage so that it can be recalled faster, whereas infrequently accessed files can be relocated to lower performance storage. The NAS enhancement appliance 202 is capable of managing and relocating files based on attributes such as on file size, file type, owner, and frequency of access, while the user continues to access the file in its original location, irrespective of any relocation that may have occurred due to expansion, migration or degmigration. It is primarily used to manage current storage as opposed to being used as an independent storage option.

Main Components of the NAS Enhancement Appliance

Hardware Aspects:

In one embodiment, the NAS enhancement appliance 202 is delivered in a standard 1U rack mounted server chassis. This server is ideally constructed with processing capability using the CPUs from Intel coupled with strategic application of solid-state drives (SSDs) in order to deliver significant performance advantages. The NAS enhancement appliance 202 also features multiple 1G or faster network interfaces in order to provide optimal network throughput.

The NAS enhancement appliance 202 is inserted into a storage environment where it sits between traditional NAS 102 and the clients or servers, as illustrated in FIGS. 2 and 3. It acts as a router, NAS gateway 320, and cloud gateway 322.

In one embodiment, the hardware features of the NAS enhancement appliance 202 including the following:

Server case: Athena Power RM-2U2026S60 Black Steel 2U Rackmount Server Case—OEM—with single 600 W power supply.

Motherboard: ASUS M5A97 LE R2.0 AM3+ AMD 970 SATA 6 Gb/s USB 3.0 ATX AMD Motherboard with UEFI BIOS.

Processor: AMD FX-8320 Vishera 3.5 GHz (4.0 GHz Turbo) Socket AM3+ 125 W Eight-Core Desktop Processor FD8320FRHKBOX.

RAM: G.SKILL Ares Series 16 GB (2×8 GB) 240-Pin DDR3 SDRAM DDR3 1333 (PC3 10666) Desktop Memory Model F3-1333C9D-16GAO.

SSD: single 128 GB card.

Network cards: 2× Intel EXPI9301CTBLK 10/100/1000 Mbps PCI-Express Network Adapter.

Video card: MSI R5450-MD1GD3H/LP Radeon HD 5450 1 GB 64-bit DDR3 PCI Express 2.1×16 HDCP Ready Low Profile Video Card.

HDD: Western Digital WD Green WD30EZRX 3 TB IntelliPower 64 MB Cache SATA 6.0 Gb/s 3.5" Internal Hard Drive—OEM Software Aspects:

In one embodiment, the NAS enhancement appliance 202 can include the following software organization, as illustrated in FIG. 4 (Software Overview of Network Enhancement Appliance):

A Linux operating system.

FUSE File System—A FUSE file system (pxfs) and component libraries (pxlibs). Pxfs manages file system expansion; data migration between storage tiers at the sub-file level; file system relocation; and compresses/decompresses data in transit to/from NAS 102.

Cache Manager 306 that includes cache management 308 and SSD cache 310 and exploits SSD and HDD storage in the NAS enhancement appliance 202 for NAS acceleration.

Migration Engine 314 to relocate data from a managed file system to lower storage tiers, either according to policy that is periodically executed, or as a one-time event.

Compression 316 and Deduplication 318—to compress existing files in a managed file system and deduplicate the data.

Diagnostic utilities for pxfs file systems.

CLI commands—to manage configuration, migration and compression 316.

A web GUI—interfaces to the CLI set.

Diagnostic tools—including reporting and telemetry

One main software component of the NAS enhancement appliance 202 is a managed file system (mfs) 312. When a user's file system is placed under control of the disclosed NAS enhancement appliance 202, it becomes an mfs 312. Each mfs 312 incorporates a default storage bin, the mfs storage bin, which includes free space in the mfs 312 itself. An mfs storage bin stores only object files that relate to files in the same mfs 312.

A main function of the NAS enhancement appliance 202 is to direct all network traffic through the NAS enhancement appliance 202. However, the NAS enhancement appliance 202 operates by only intercepting mfs's 312. All other network traffic is forwarded directly to the storage host.

The NAS enhancement appliance 202 has two primary tools that it uses for all of its functions: a proxy file system (pxfs) and a migration daemon. The pxfs intercepts all system calls to an mfs 312. It also performs inline expansion, compression 316 and decompression, and de-migration. For each mfs 312, pxfs exports a mount point that is identical to the mfs mount point and the NAS enhancement appliance 202 takes the host address of the mfs 312 host as a VIP (virtual IP address). Therefore, when a file under control of the NAS enhancement appliance 202 is accessed, the NAS enhancement appliance 202 interacts with pxfs, mfs 312, cache manager 306 (described below), and, depending on the current location of the target file's content, the expansion, migration or relocation storage. The migration daemon is responsible for ongoing migration of files in an mfs 312 from higher storage tiers (i.e., higher performance storage) to lower storage tiers, according to a policy defined by a user when the mfs 312 is configured. The migration daemon's function is described in further detail below.

Other main components of the NAS enhancement appliance 202 are storage bins, caches, and migration policies. Storage bins provide target storage for expansion, migration and file system relocation. Caches are temporary storage used to accelerate access to files. Migration policies dictate how the migration daemon relocates files for migration or de-migration.

Overview of System Use

Figure 6:
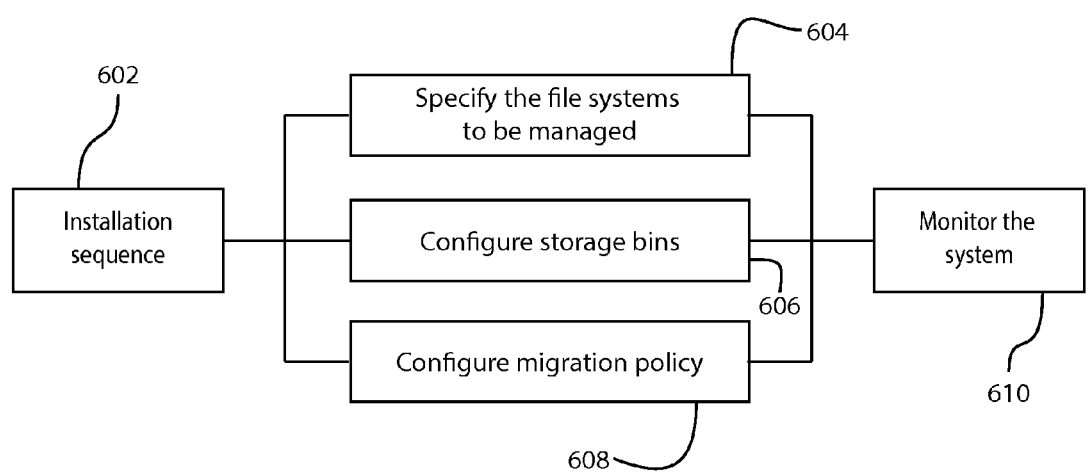
FIG. 6 illustrates an overview of system use according to one embodiment of the disclosed invention.

After performing an installation sequence 602, an admin user would specify the file systems and storage bins to be managed by the NAS enhancement appliance 202, together with acceleration and compression attributes, and migration policies, as illustrated in FIG. 6. Thereafter, the NAS enhancement appliance 202 manages acceleration, compression 316, deduplication 318, file system expansion, data migration and file system relocation automatically, with no disturbance to clients.

The Storage Administrator's job may done in 5 steps, as illustrated in FIG. 6:

Simple install using the installation sequence 602
Specify the file systems to be managed 604
Configure storage bins 606 and storage to be used
Configure the migration policy 608, if the mfs 312 is to be migrated
Monitor the system 610

Figure 5:
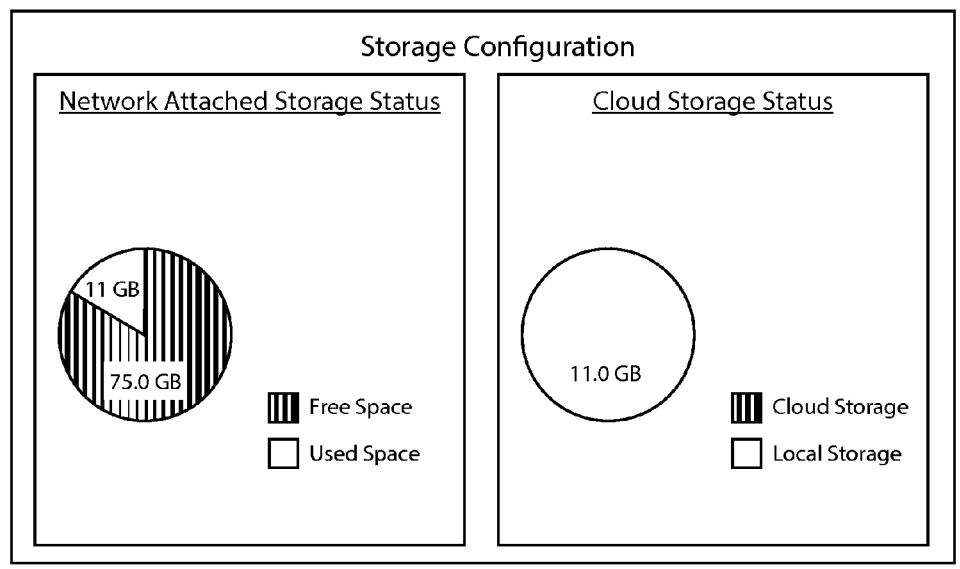
FIG. 5 illustrates a storage configuration according to one embodiment of the disclosed invention.

Ongoing monitoring is through a single dashboard that depicts local NAS 102 and cloud storage 204 usage, as illustrated in FIG. 5. The dashboard also gives an admin user the ability to monitor the NAS enhancement appliance server and NAS servers.

Preliminary Set-Up

Figure 7:
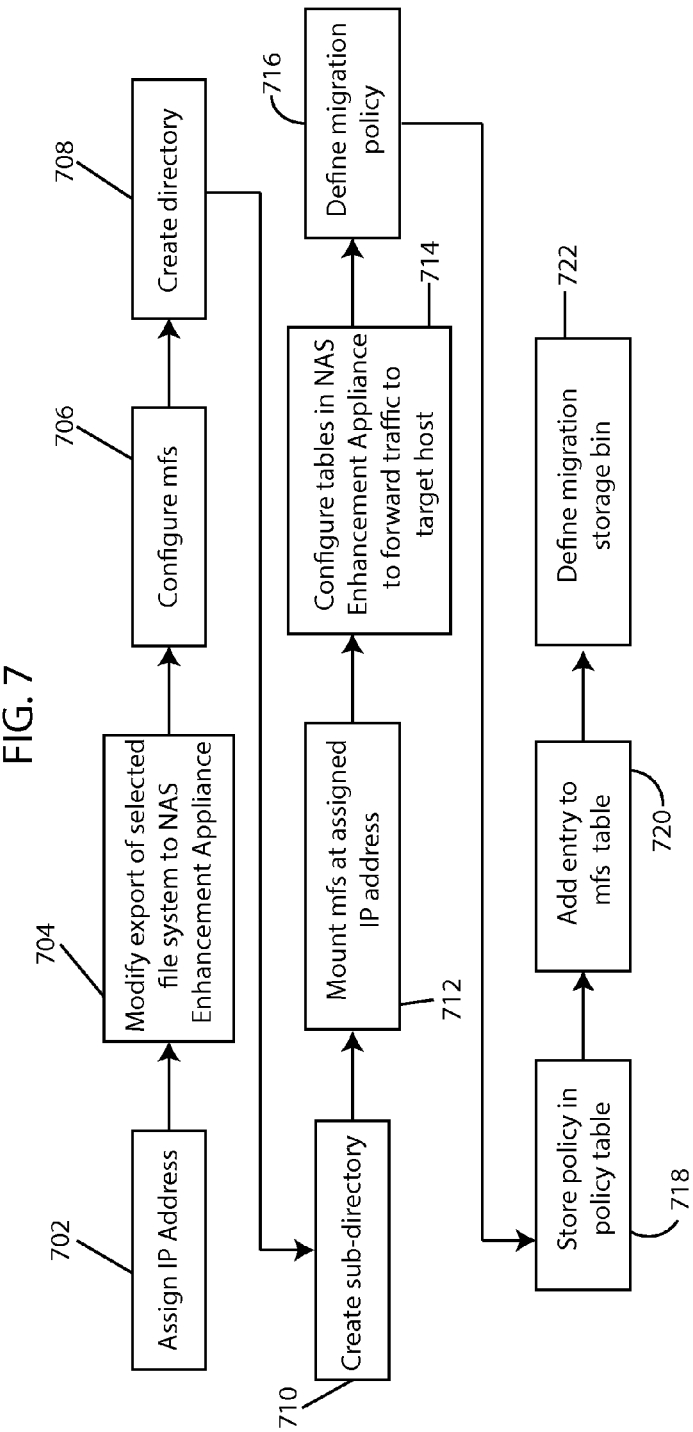
FIG. 7 illustrates how a user can configure the NAS enhancement appliance according to one embodiment of the disclosed invention.
Figure 8:
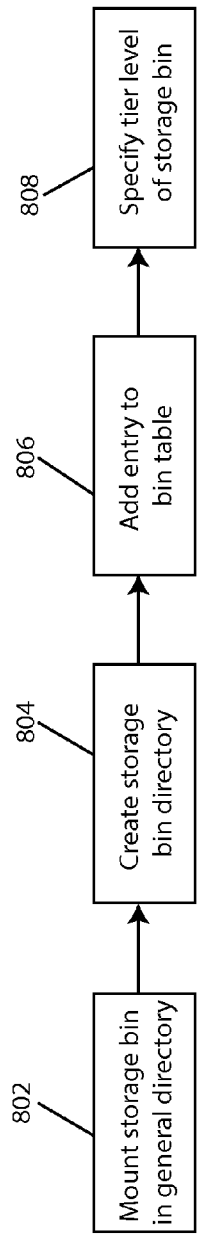
FIG. 8 illustrates one example of how a user can configure a non-mfs storage bin within the disclosed invention.

When setting up the NAS enhancement appliance 202, a user configures the network and the NAS enhancement appliance 202, as illustrated in FIG. 7. Configuration of the NAS enhancement appliance 202 involves configuring managed file systems, storage bins, as illustrated in FIG. 8, a host address table, an MFS table, a bin table, and a policy table.

During configuration of the network, the NAS enhancement appliance 202 assumes the identity of the host server and the host server is reconfigured to export its file systems to the NAS enhancement appliance 202. Therefore, all network traffic to the host server passes through the NAS enhancement appliance 202 and the appliance 202 has sole control over all file systems even though it will only actively manipulate managed file systems.

In one embodiment, a network with many managed file systems can use one or more of the disclosed NAS enhancement appliances 202 to manage the data. However, one mfs 312 cannot be managed by more than one of the disclosed NAS enhancement appliances 202; only one NAS enhancement appliance 202 per mfs 312 is allowed.

Configuration of the NAS enhancement appliance 202 itself involves configuration of mfs's 312, storage bins, a host address table, an MFS table, a bin table, and a policy table.

To configure an mfs 312 exported by a target host, a user can complete a series of steps. First, if the IP address of the target host has not previously been reassigned, assign it a new IP address 702 that will be referred to as currentIP. Second, in the current storage, modify export of the selected file system to the NAS enhancement appliance 704. Third, configure the mfs 706 in terms of originalIP, currentIP, mountPoint, policyID, cache name, acceleration flag, compression flag, and migration or file system relocation storage bins. Fourth, if this is the first mfs 312 for originalIP, create a directory 708 (such as/mfs/originalIP) and create a subdirectory 710 (such as/mfs/originalIP/mountPoint) and mount the mfs 312 at address currentIP on it 712. Fifth, configure iptables in the NAS enhancement appliance 202 to forward all non-NFS IP traffic arising at originalIP to the target host at currentIP 714. Sixth, define a migration policy for the mfs 716 if the mfs 312 is to be migrated and store its policy in the policy table 718. Seventh, add an entry to the mfs table 720. Lastly, define the migration storage bin that can store mblock files and mapping files related to mfs files 722; if the mfs 312 is to be subject to expansion or file system relocation, define storage bins as appropriate.

To configure a storage bin, other than an mfs storage bin, a user can complete a series of steps, as illustrated in FIG. 8. First, mount the storage bin in a general directory 802 (such as /bfs/mountPoint). Second, create the storage bin directory itself 804 (such as /bfs/mountPoint/.sbin). Third, add an entry to the bin table 806. Fourth, specify the tier level of the storage bin 808.

The NAS enhancement appliance 202 contains several tables in its own storage that can be set up by a user during configuration. One table is a host address table. Each line in the host address table contains the original IP address of host storage in connection with the current IP address of the same host. The original IP address is a virtual IP address of the NAS enhancement appliance 202.

Another table contained in the NAS enhancement appliance's storage is an MFS table. The MFS table contains an entry for each mfs 312. Each entry contains information such as, but not limited to, originalIP, currentIP, mountPoint, mount arguments, policyID, cache name, acceleration flag, compression flag, one or more migration targets or storage bins, and relocation modes. An mfs 312 that is subject to file system relocation cannot be subject to expansion or migration. An mfs 312 that is not subject to file system relocation can be subject to expansion or migration in any combination.

A third table contained in the NAS enhancement appliance's storage is a bin table. The bin table contains an entry for each storage bin except for mfs storage bins. The entry is made using the storage bin's binID. The binID is extracted from an object locator and serves as a unique numeric identifier. An object locator refers to a unique identifier for an object file, which is a file created for storage such as an mblock file or mapping file. The entry contains information such as the mounted path in the NAS enhancement appliance 202 through which the bin is accessed, cache name, policyID, and tier level. A storage bin can be accessed through a directory beneath the mount point for the storage bin.

The last table contained in the NAS enhancement appliance's storage is a policy table. The policy table is indexed by policyID. PolicyIDs are associated with an MFS table entry or a bin table entry. Each entry includes information for the policy such as, but not limited to, the owner, group, file type, and file size. Predefined, fixed policies may be available for selection when a user is configuring an mfs 312. For example, a null policy will result in no migration from the mfs 312 whereas a default policy will result in every file in the mfs 312 being a migration candidate.

General Information for Relocated Files

Several components of the disclosed NAS enhancement appliance 202 are applicable to any file that is relocated, whether it is involved in migration, expansion, or acceleration. These components include, but are not limited to, the process of chunking, the representation of an altered file, object locators, stub files, mapping files, and the process of mapping file migration. For the file system relocation operating mode, a file is copied in its original form, without chunking. The file is copied one block at a time, but the copy when complete consists of a single file, identical to the original.

Chunking

A file can be chunked into smaller corresponding files when it is expanded or migrated. Additionally, chunking allows larger files to be partially relocated. This process makes it more efficient to relocate and recall larger files during migration and demigration. Chunking benefits storage consumption and system performance. The unit of relocation for chunking is the mblock. During prechunking, mblock files will be stored in the mfs storage bin. A file is "chunked" when it is replaced by discrete files, each of the same length with the exception of the last chunk, which usually contains the trailing part of the file. In one embodiment, the preferred mblock size is referred to as MBLKSIZE, is 1 megabyte, and is used for migration and expansion.

In general, the chunking process applied to a file is determined by file size. If a file smaller than MBLKSIZE will be written to expansion storage or migrated, it is relocated at its current size and is not chunked; the file is relocated as a single mblock equal in size to the file and is identified by its object locator. If a file is larger than MBLKSIZE, it is chunked before relocation. If chunking occurs, a mapping file is created to mediate access to the chunked file.

For migration or expansion, a file smaller than PRECHUNK_SIZE will only be chunked when it is selected for relocation. The entire file will be chunked from beginning to end and each chunk will be of length MBLKSIZE with the exception of the last chunk. The last chunk contains the trailing part of the file modulo MBLKSIZE. For example, if a file is 4 MB+50K and MBLKSIZE is 1 MB, the file will be chunked into 4×1 MB mblocks and one 50K trailing mblock.

If a file is relocated as a result of file system relocation, the file is not chunked. The file will be copied one block at a time to relocation storage, but is created as a single file, identical to the source file.

If a file is larger than PRECHUNK_SIZE and is selected for prechunking based on relevant policies, the file will be fully chunked as a background process before it is selected for relocation. Prechunking occurs because a file larger than PRECHUNK_SIZE is a likely candidate for relocation at a later time and, when relocation occurs, it is likely to be partial.

Representation of an Altered File

Prior to any alteration of an unperturbed file, the file in the mfs 312 represents the original, unperturbed file. Unperturbed files do not consume resources in the NAS enhancement appliance 202. File representation is changed subsequently if the file is perturbed through compression 316, expansion or migration activity.

Representation of a perturbed file depends on file size. A relocated file smaller than MBLKSIZE is renamed using an object locator that is stored in a stub file in the mfs 312. When a file is bigger than MBLKSIZE and is therefore chunked into mblocks, a mapping file is created that contains object locators for the file's constituent mblocks. The mapping file is identified by the object locator in the stub file. The file type field in an object locator distinguishes between mapping file, mblock file, and compressed block file.

If the number of perturbed files in an mfs directory exceeds a limit, some of the existing perturbed file names can be moved into a relocation table in the directory and the stub files can be deleted. Deletion of stub files avoids consuming an excessive number of inodes in the mfs 312.

Object Locator

An object locator (objloc) serves as a unique identifier for any object file in the NAS enhancement appliance 202. The file could be a mapping file, mblock file, or compressed mblock file.

In one implementation, an objloc has 16 hex characters: 64 bits in binary form or 16 characters in ASCII; four bits correspond to 1 hex character. The first hex character is reserved and is 0. The next three hex characters contain the binID, which is the identifier of the bin table entry. The corresponding bin table entry contains the bin access path, tier level and policyID. The next 8 hex characters of the objloc are a file path in a storage bin. In one embodiment, the form of the file path is aa/bb/cc/dd. The last 4 hex characters are reserved for flags. Flags describe the object type such as, but not limited to, mblock file, compressed mblock file, or mapping file.

For example, one object locator may look like: 001eeab979fd0002. The first 0 is reserved. The 01e are the binID. The eab979fd refers to the file path ea/b9/79/fd. The 0002 is a flag representing a compressed block.

Stub File

A stub file refers to a file that remains in an mfs directory when the number of files relocated from a directory is below a threshold. If the number of files relocated due to expansion or migration exceeds the threshold, an entry is instead made in the "migration table" to limit the number of inodes created in the mfs 312 due to expansion.

Stub files are made for both expansion and migration (but not file system relocation). In one implementation, a stub file contains an 8-byte magic number, 8-byte object locator, and 8-byte checksum. The stub file data fits into the stub file's inode as inline data, such that the file system will not allocate blocks to the stub file.

Mapping File

In one implementation, a mapping file contains a fixed-length header followed by an array of extent descriptors. The fixed-length header contains at least three items. First, the hash of file contents for verification whenever the file is read. This is reset whenever the file is written. Second, the length of the file contents for the mapping file. Third, the number of extent descriptors.

Each extent descriptor contains an offset in the file, an object locator for the corresponding mblock file, the mblock length in bytes, and the approximate timestamp of the most recent read or write of any data in this extent. In one embodiment, the timestamp update is not synchronous with every read or write; it is updated periodically by pxfs, which contains data on the most recent access. The extent descriptors are ordered by file offset.

Mapping File Migration

A mapping file is always located in the highest-tier storage bin that contains an mblock of the subject file. For example, if a large file is prechunked in a top tier bin and some mblocks subsequently migrate to a lower tier bin, the mapping file remains in the top tier bin until the last mblock is migrated to the lower tier bin. At that time, the mapping file itself is moved to the lower tier bin. If any mblocks de-migrate from the lower tier bin back to the top tier bin, the mapping file is also returned to the top tier bin.

Expansion

Expansion, which occurs inline and under pxfs control, is necessary when an mfs 312 reaches capacity and expansion storage has been configured for the mfs 312. In one embodiment, expansion occurs when new data is appended to an existing file or data is written to a new file that is written to the expansion storage configured for the mfs 312. A file classifies as having been expanded when part, or all, of the file is stored in expansion storage.

When only part of a file is stored in expansion storage, the other part of the file is stored in the mfs 312 in whose namespace it occurs. A file can be partly stored in expansion storage when the file system reaches capacity as a file is being appended. On the other hand, as described above, a file can be prechunked, and its representation altered, before being relocated to expansion storage.

An expanded file is represented by a stub file, which can point to an entire file or a mapping file. If the number of perturbed files in a directory exceeds a limit, the file name and object location are stored in a table in the directory. This storage helps to limit the number of inodes created in the mfs 312 due to expansion.

In one embodiment, expansion storage is comprised of an expansion storage bin, which is associated with one or more managed file systems, such that the capacity of the expansion storage bin is distributed among the selected managed file systems. As a managed file system reaches capacity, pxfs will transparently overflow new data to expansion storage configured for the managed file system. Transparent here means that overflow is not visible to the user through the namespace of the managed file system; the expansion storage simply makes the managed file system appear to have a larger capacity. Expansion storage that receives overflow data from a managed file system is reserved for that purpose only, and in particular, does not serve as migration or file system relocation storage. A managed file system can only overflow into those storage bins configured as expansion storage for that particular mfs 312.

An expansion storage bin can be identified by file system mount point, irrespective of the storage media. It can serve as receptacle for object files created by the NAS enhancement appliance 202 and is not exported to clients. The NAS enhancement appliance 202 does not necessarily have exclusive access to the host from which a storage bin is exported.

Migration

In general, migration is the movement, or migration, of files in an mfs namespace from higher performance storage tiers to lower performance storage tiers, according to migration policy that is defined when the mfs 312 is configured. Migration is controlled by the migration daemon.

On a periodic basis, the migration daemon uses the migration policy configured by the user for the mfs 312 to generate a list of files that have been filtered from the mfs namespace. The files kept on the list are those that the migration daemon will migrate, and the files are chosen based on migration policy configured for the mfs 312.

The migration daemon migrates as few files as possible by pruning just enough files so that the mfs free space is brought below the high water mark. Each file kept on the list is then migrated, leaving behind either a stub file or a migration table entry. The stub file or migration table entry directs future access to an mblock file, if the file size is smaller than MBLKSIZE, or to a mapping file. If a mapped file is fully migrated, the mapping file is migrated as well.

If a managed file system is configured for migration, migration daemon operates in three phases. First, the migration list is generated according to migration policy.

Second, the migration daemon migrates the files. Migration occurs using the chunking process if necessary, wherein a file smaller than MBLKSIZE is migrated as a single mblock but an unchunked file larger than MBLKSIZE is chunked into MBLKSIZE files with the last mblock being the size of the remainder of the file. The file is not left as a remainder stub file until the entire file has been migrated.

Data is automatically migrated downwards in a storage bin hierarchy according to mfs migration policies defined by a user. Tier levels may be, but are not limited to, SSD, high-performance disk, lower-performance disk, tape (LTFS) and cloud 204 (through cloud file system).

Auto-migration enables automatic, optimal use of available storage resources. Hot database data can be retained in SSD, while cooler database data can be migrated to lower-cost storage and, eventually, as it cools more, to lowest-cost storage. The user can define a suitable migration policy and configure appropriate storage bins in order for the disclosed NAS enhancement appliance 202 to migrate stale regions of any type of data without administrative intervention (for example, stale regions of e-mail database).

A migration storage bin serves as a migration target for one or more managed file systems. Unlike expansion storage, migration storage is gregarious; it is not associated with specific managed file systems. Whereas expansion causes new data to be stored to expansion storage configured for the particular managed file system, migration causes selected data to be relocated to any migration storage at the appropriate tier level.

Third, files larger than PCHUNKSIZE are selected for prechunking based on migration policy. Prechunking occurs from end to beginning of the file and the subject file is truncated as each corresponding mblock file is created and the mapping file is updated. During prechunking, mblock files are created in the mfs storage bin and are not yet migrated.

During migration and prechunking, the migration daemon must coordinate with pxfs. The migration daemon generates the migration list (list of files to be migrated), then migrates each file by making an ioctl call to pxfs. Access to the subject file through pxfs (which controls expansion, compression 316, decompression, and de-migration) is blocked while pxfs updates the stub file or mapping file.

The namespace of an mfs 312 is always preserved in the mfs 312 itself. Directories are not migrated and sufficient metadata remains in the mfs 312 to locate migrated files. In contrast, a storage bin serves only to provide storage for mblocks and mapping files created during expansion or migration, but without any namespace visible to clients. Therefore, a user can see namespace in the mfs 312 only, not in a storage bin (even if data resides in the storage bin).

Files that existed before the file system was moved under control of the NAS enhancement appliance 202 appear, to the user, to remain the same afterwards, as illustrated in FIG.

9. More specifically, any time a client wishes to view a file, the client will see the entire file. However, parts of the file may be saved at different storage tiers. An mfs' namespace is always rooted in the mfs 312 itself, irrespective of how many files have been relocated from it.

By preserving the namespace, an mfs 312 can migrate many more files than it can typically store. Migration capacity is limited by availability of target migration media and storage rather than the capacity of the mfs 312. For example, a relatively small SSD file system is able to migrate more files to down-tier media than it can accommodate itself.

Migration of a file with hard links to another directory presents a difficulty because, during chunking, a file is replaced with a stub file that does not contain the hard link. In one embodiment, the NAS enhancement appliance 202 can check the link counts in a file when it is first perturbed by the appliance 202.

If the link count is greater than one, a mapping from the file's inumber to the migrated file's object locator is inserted into the mfs' link table. The association in the link table between the file's inumber and an object locator permit the perturbed file to be properly accessed using the object locator. The object locator may reference a small, migrated file or a map of a larger migrated file. The map may remain resident in the same mfs 312 or it may have been relocated.

If a hard link is created to a migrated file, an entry must be added to the link table, if not already present. If the link count of a migrated file is decremented to one, the link table entry must be removed. In one implementation, the link table is stored as a simple sparse table with each range of 1M inodes stored in a file. This allows the inumber range to increase should the mfs 312 support dynamic increase in inode count. Each entry contains 8 bytes for the inumber and 8 bytes for the object locator. For example, within each table fragment, if a relevant entry is inumber modulo 1M, a file with 100M inodes would require 1.6 GB.

If an mfs 312 is configured for file system relocation, rather than migration, the migration list generated by the migration daemon is the entire list of files in the mfs 312. For each file, an ioctl system call is made to pxfs to cause the file to be copied to the relocation storage bin. A file is copied as follows. Beginning at offset 0, each MBLOCK-sized block of the file is copied to a file of the same name, at the same offset in the relocation storage bin. A bitmap of copied blocks is maintained. If a write is intercepted to a block that has not yet been copied, the write is applied to the source file only. If a write is intercepted to a block that has been copied, the write is applied to both source and target files. When all files have been copied, the migration daemon makes a second ioctl system call to pxfs, after which all writes are applied to the target file system only, and the source file system is unmounted. At this point, the source file system is inactive and the storage in which it resides can be taken offline. Note that during file system relocation, applications are not disturbed, and can continue to read and write the file system being relocated without hindrance.

De-Migration

De-migration, which is controlled by pxfs, occurs when data previously migrated from an mfs 312 to lower-tier storage subsequently becomes hot as a consequence of a single write or a certain number of reads. In comparison, migration is initiated by the migration daemon according to policy written by the user. De-migration can also occur if migration storage is configured for an mfs 312 at a higher tier level than the mfs 312.

Multiple storage bins can be specified as migration targets, both at higher and lower tier levels. When mfs data is de-migrated, it is relocated from its current location to the highest tier storage bin configured for the mfs 312. Therefore, while migration will move a file from SSD to HDD, de-migration will move a file from HDD, cloud 204, or tape to SSD.

Acceleration

The NAS enhancement appliance 202 provides cache storage to facilitate acceleration; it does not store persistent data. Files being currently edited, or files that are accessed and read frequently, can be stored in the NAS enhancement appliance's SSD to facilitate faster access, which is mediated by acceleration through the cache manager 306.

Cache Manager

The cache manager 306 mediates acceleration. It works as a filter driver between FUSE core and pxfs and, because it sits on top of pxfs acting as a filter driver, it is invoked by FUSE core when pxfs interfaces are called. The cache manager 306 exploits the SSD storage in the NAS enhancement appliance 202 for acceleration by using SSD cache 310, and it is involved in cache management 308. In one embodiment, the cache manager 306 enhances NAS acceleration. In another embodiment, the cache manager 306 enhances cloud acceleration. When pxfs is invoked to write or read a file, the cache manager 306 is activated.

The cache manager 306 controls the NAS enhancement appliance's SSD cache 310. The SSD cache 310 stores files that are currently being altered or that are frequently accessed. The cache file is self-contained, in that it contains all necessary metadata to resume after a hard reboot. The cache manager 306 reads data into the SSD cache 310 from persistent storage and then writes the data back to persistent storage. Persistent storage is, for example, storage on a SSD, HDD, cloud 204, or tape.

Acceleration occurs when a file is decomposed, or chunked, into units of CBLKSIZE. In one embodiment, the size of the CBLKSIZE block is 64K. Each CBLKSIZE block is associated with a header that, in one embodiment, is 256 bytes. The CBLKSIZE blocks are stored in the cache header table at offset 0 of the cache file.

During cache manager initialization, the block header table is copied into RAM. The block header table is stored at offset 0 of the cache file, and other global items such as mutexes are created and initialized. The in-memory copy of the block header table does not have to be written to the cache file when the cache manager 306 is terminated because each header is immediately persisted to the cache file when modified in memory. A header is modified in the cache file by writing the entire header rather than updating discrete entries in the header individually. In one embodiment, pxfs passes function pointers pxfs_read and pxfs_write to cache_init( ) for use by cache_read( ) and the cache write back threads.

For example, if cache is 256G SSD at the directory/dev/ssd and CBLKSIZE is 64K, then there are 4 million CBLKSIZE blocks. The block header table will occupy 1 GB at offset 0 in /dev/ssd and there will be a 1 GB mirror copy kept in RAM. Cache storage is relatively small and effective use of it necessitates a small block size. In comparison, migration storage is much bigger than cache storage and, to limit the number of mblock files created during chunking, the migration block size must be correspondingly large.

Acceleration Process

At the beginning of an acceleration process, the cache block header is sufficient to identify a block when it is read into the cache or when a dirty cache block must be written back to persistent storage. The cache block header contains the file path, file block number, minimum and maximum offsets of valid data within the block, and flags (dirty, wanted, busy). In the header stored in the cache file, a dirty flag may be set, which indicates the block has been written but not yet written back to the file. The in-memory copy of a cache block header also contains flags for access synchronization. Synchronization flags indicate that the flagged cache metadata is not needed for recovery. This data is stored in RAM only.

A file block is located in the SSD cache 310 by hashing the file path and the file block number. In the prior example, the SSD cache 310 contained 4 million blocks. To add on to that example, if the SSD cache 310 contains 4 million blocks, 27 bits of hash value serve as a cache block index. The cache block index indexes the block header table in memory.

As stated above, a file to be written into the cache manager 306 is decomposed into CBLKSIZE blocks. A search is done in the cache manager 306 for any cache blocks that correspond to the written blocks. If there is a match, the cache block is overwritten. If there is not a match, the new CBLKSIZE blocks need to be added to a cache block. If a cache block to be used is dirty (i.e., it has other data stored on it), the cache block must be written back to the original storage before it is stolen. If a cache block to be used is not dirty, the new CBLKSIZE block is written to the cache block.

Once the file is written into the cache manager 306, the dirty cache block is queued for write-back to the original location of the file through the use of a write-back thread (described below). A file to be read is likewise decomposed into CBLKSIZE blocks and a search is done in the cache manager 306 for each block. If the block is already present in the cache manager 306, the new CBLKSIZE block is returned to its original location. If it is not present, it is read through pxfs.

If the block has been read more than a pre-determined number of times since the file was opened, the block is copied into the corresponding cache block, in anticipation of future reads of the same block. Similar to a write, if the cache block contains a different file block and is dirty, the different file block is first written back.

Write Back

The cache manager 306 creates a write-back queue for each open file and a corresponding write-back thread to service it. When a cache block is written, it is flagged as dirty, and the dirty cache block is queued for write-back and a signal is sent to the write-back thread. However, if the block was dirty before it was written, it will already be queued for write-back. The write completes back to the client and the write-back thread writes the block to persistent storage. A particular cache block appears on the write-back queue only once at any moment.

Writing from SSD cache 310 to mblock is less straightforward than writing from mblock to SSD cache 310. One complication is that data written into CBLKSIZE blocks for SSD cache 310 may be offset at a value other than 0 in the block. Therefore, one cache block may not contain the entire contents of the cache block unit. Another complication is that the mblock may be compressed. In this case, the cache block is first read from the mblock into a buffer, decompressed, and bytes from offset 0 to cache block valid minimum, and cache block valid maximum+1 to CBLKSIZE−1 are copied to the cache block. At this point, the cache block contains the correct CBLKSIZE contents of the cache block unit.

When the write-back of a dirty cache block completes, the write-back thread resets the dirty flag in the cache block header. It is possible for subsequent read/write to a cache block to proceed while it is queued awaiting write-back. Read/write to a cache block is suspended only while write-back is in progress.

A cache open interface creates an empty write queue, and passes it to a write-back thread, which is created to service all cache block write-backs for the open file. Each cache block queued to a write-back thread is described by a structure containing the cache block index and queue pointers.

Example of a Write

In this example, CBLKSIZE is 64K, and a file write of length 32K at file offset 48K is received by pxfs. Because the file is offset at 48K, the write spans two CBLKSIZE blocks. The write affects bytes 48K to 64K−1 in the first block, and bytes 0K to 16−1K in the second block.

A cache lookup is done for each of the two blocks. As described above, the cache manager 306 identifies the cache block by hashing the file path and the file block number. After the path and block number in the cache block header in memory are verified, they are compared to the write block. If the blocks match, the cache block is the wanted one. If they do not match, the cache block is stolen by replacing the path and block number in memory and in the cache file. However, if a block is stolen, it must first be written back synchronously if it is marked dirty.

When the cache block is stolen, the previous contents of the cache block are no longer cached. If a new file write of length 64K at file offset 16K is received by the cache manager 306 and directed to the same two cache blocks, the minimum/maximum valid byte range in the first block will be changed so that it is now affected from 16K to 64K−1K. The second block's byte range will be unaltered because only 16 bytes carry over from the first block.

If the file is compressed, this process is slightly altered. If an mblock is compressed into CBLKSIZE units, each of which contains slightly less than an uncompressed CBLKSIZE unit, acceleration is altered from the typical operation. A cache block of CBLKSIZE contains 8 fewer bytes of mblock data. Here, the first block would contain 16K−8 at offset 8+48K and the second block would contain 8+16K at offset 8. The minimum/maximum valid ranges for the two blocks would reflect this. After writing to the cache block, the dirty flag is set in the cache block header and the write-back thread is signaled using a condition variable.

Example of a Read

In this example, CBLKSIZE is 64K, and a file write of length 32K at file offset 48K is received by pxfs. Because the file is offset at 48K, the write spans two CBLKSIZE blocks. The write affects 16K offset at 48K in the first block, and 16K offset at 0 in the second block. In this example, FUSE calls cache_read, which searches the SSD cache 310 for the required blocks. If a block is not found in the SSD cache 310, the cache manager 306 calls pxfs_read to obtain the block from persistent storage. If the same block has been read a certain number of times, the cache manger 306 copies the file block into the corresponding cache block before returning.

The cache manager 306 maintains a read count for each CBLKSZIE lock of an open file. As described in the write section, reading through the SSD cache 310 may be complicated by the fact that some reads are not CBLKSIZE-aligned. In this case, the cache manager 306 must read the missing 16K at offset 0 into the cache block from persistent storage by calling pxfs_read, then update the valid byte range of the block.

Compression 316 also complicates reading from an mblock file. If an mblock is compressed into CBLKSIZE units, each of which contains slightly less than an uncompressed CBLKSIZE unit, acceleration is altered from the typical operation. If the mblock file is compressed, a cache block unit of length 65K is read from its offset position within the mblock file, similarly to the non-compressed case. The first 8 bytes contain the compressed length of valid data within the 64K, beginning at offset 9. This allows the block to be decompressed.

Compression

Compression 316 of a file is controlled by pxfs through the use of the compression daemon. When a file is compressed, it is decomposed into smaller units within each mblock. The unit size for compression 316 is CBLKSIZE, which is also the unit size for acceleration with the cache manager 306.

Each CBLKSIZE block is individually compressed. In one embodiment, compression 316 removes 8 bytes of mblock data at offset 8 within the CBLKSIZE unit. Leaving the first 8 bytes of data allows decompression of the file when read. When pxfs writes to a cache block for acceleration, data is written to offset 8 instead of offset 0, and the cache block holds 8 bytes less data. Each cache block unit is stored at offset n*CBLKSIZE within the mblock file, such that the mblock file is partially sparse, according to compression effectiveness.

If a file in an mfs 312 is not the subject of a write or read operation, it may still be compressed. The compression daemon periodically scans an mfs 312 configured for compression 316 and will compress any unperturbed file. It is unnecessary to search for perturbed files if the mfs file is configured for compression 316, because any perturbed files would have been compressed when they were first perturbed.

Perturbing a file for compression 316 is similar to migration, except that the target storage is the mfs storage bin. For example, a file smaller than MBLKSIZE that is compressed is replaced by a stub file that points to a compressed mblock in the mfs storage bin. If the file is larger than MBLKSIZE, it is replaced by a stub file that points to a mapping file, which in turn points to compressed mblocks of the file.

The chunking algorithm described above is used for compression 316 as well: files larger than MBLKSIZE and smaller than PCHUNKSIZE are chunked and compressed, then files larger than PCHUNKSIZE are chunked from end to beginning with one mblock at a time being written to storage.

Figure 10:
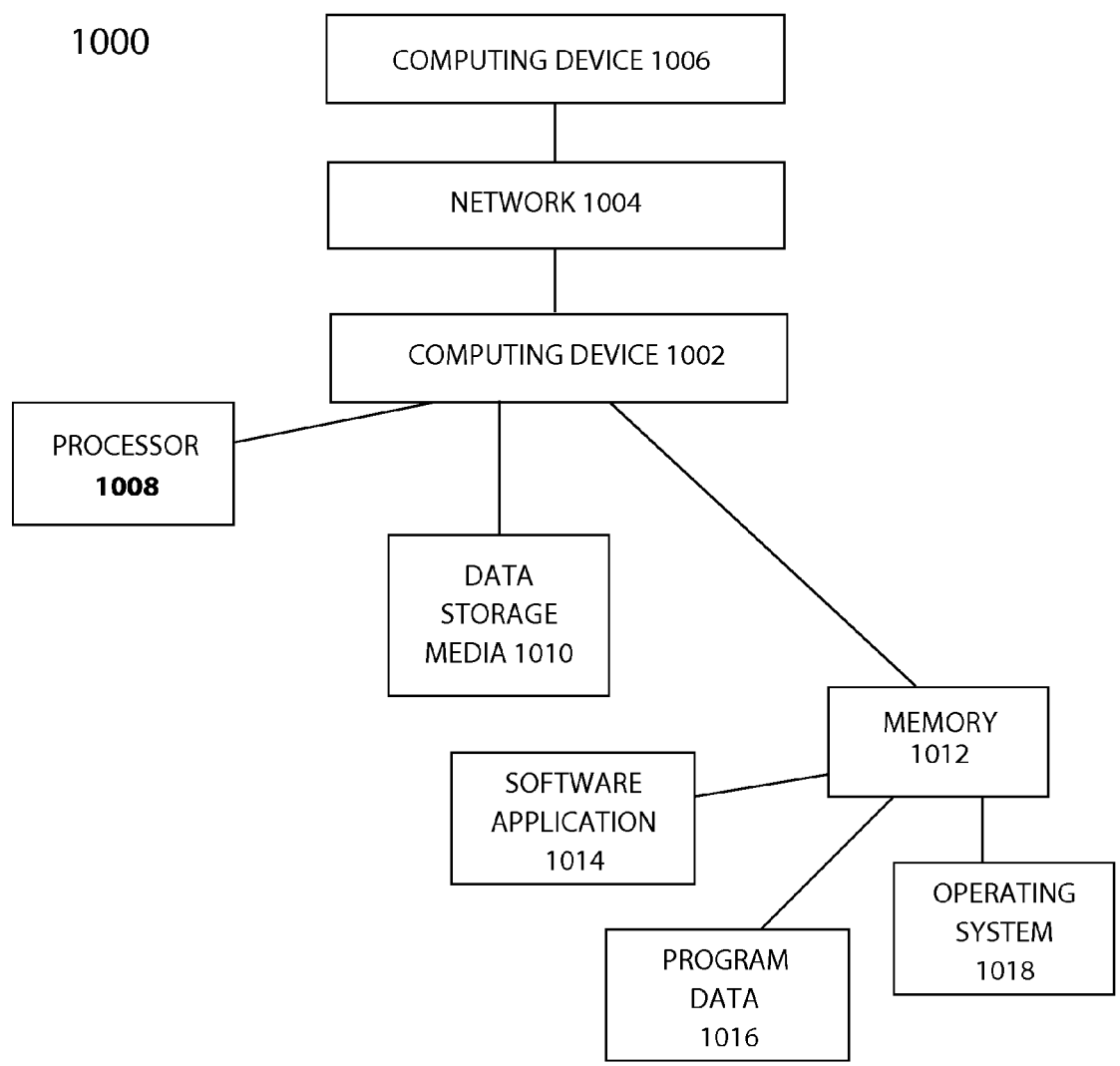
FIG. 10 is a schematic block diagram depicting an example computing system used in accordance with one embodiment of the present invention.

In some embodiments, the system described herein uses a computing system to carry out the various functions described herein. FIG. 10 is a schematic block diagram of an example computing system 1000. The example computing system 1000 includes at least one computing device 1002. In some embodiments the computing system 1000 further includes a communication network 1004 and one or more additional computing devices 1006 (such as a server).

The computing device 1002 can be, for example, located in a user's home or other place of business. In some embodiments, computing device 1002 is a mobile device. The computing device 1002 can be a stand-alone computing device or a networked computing device that communicates with one or more other computing devices 1006 across a network 1004. The additional computing device(s) 1006 can be, for example, located remotely from the first computing device 1002, but configured for data communication with the first computing device 1002 across a network 1004.

In some examples, the computing devices 1002 and 1006 include at least one processor or processing unit 1008 and system memory 1012. The processor 1008 is a device configured to process a set of instructions. In some embodiments, system memory 1012 may be a component of processor 1008; in other embodiments system memory 1012 is separate from the processor 1008. Depending on the exact configuration and type of computing device, the system memory 1012 may be volatile (such as RAM), non-volatile (such as ROM, flash memory, etc.) or some combination of the two. System memory 1012 typically includes an operating system 1018 suitable for controlling the operation of the computing device 1002, such as the WINDOWS® operating systems or the OS X operating system, or a server, such as Windows SharePoint Server, also from Microsoft Corporation, or such as a Mac Mini with OS X. The system memory 1012 may also include one or more software applications 1014 and may include program data 1016.

The computing device 1002 may have additional features or functionality. For example, the computing device 1002 may also include additional data storage devices 1010 (removable and/or non-removable) such as, for example, magnetic disks, optical disks, or tape. Computer storage media 1010 may include volatile and nonvolatile, removable and non-removable media implemented in any method or technology for storage of information, such as computer readable instructions, data structures, program modules, or other data. System memory, removable storage, and non-removable storage are all examples of computer storage media. Computer storage media 1010 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device 1002. An example of computer storage media 1010 is non-transitory media.

In some examples, one or more of the computing devices 1002 and 1006 can be located in an establishment, such as a business. In other examples, the computing device 1002 can be a personal computing device that is networked to allow the user to access and utilize the system disclosed herein from a remote location, such as in a user's home, office or other location. In some embodiments, the computing device 1002 is a smart phone tablet, laptop computer, personal digital assistant, or other mobile device. In some embodiments, system operations and functions are stored as data instructions for a smart phone application. A network 1004 facilitates communication between the computing device 1002 and one or more servers, such as an additional computing device 1006, that hosts the system. The network 1004 may be a wide variety of different types of electronic communication networks. For example, the network 1004 may be a wide-area network, such as the Internet, a local-area network, a metropolitan-area network, or another type of electronic communication network. The network 1004 may include wired and/or wireless data links. A variety of communications protocols may be used in the network 1004 including, but not limited to, Wi-Fi, Ethernet, Transport Control Protocol (TCP), Internet Protocol (IP), Hypertext Transfer Protocol (HTTP), SOAP, remote procedure call protocols, and/or other types of communications protocols.

In some examples, the additional computing device 1006 is a Web server. In this example, the first computing device 1002 includes a Web browser that communicates with the Web server to request and retrieve data. The data is then displayed to the user, such as by using a Web browser software application. In some embodiments, the various operations, methods, and functions disclosed herein are implemented by instructions stored in memory. When the instructions are executed by the processor 1008 of the one or more computing devices 1002 or 1006, the instructions cause the processor 1008 to perform one or more of the operations or methods disclosed herein.

The various embodiments described above are provided by way of illustration only and should not be construed to limit the claimed invention. Those skilled in the art will readily recognize various modifications and changes that may be made without following the example embodiments and applications illustrated and described herein and without departing from the true spirit and scope of the claimed invention.

We claim:

1. A method comprising:
   connecting a network-attached storage (NAS) enhancement appliance to a network to which a NAS device currently storing data for a plurality of clients is connected, the NAS device having an original Internet Protocol (IP) address by which the clients access the data;
   assigning the NAS device a new IP address on the network;
   configuring the NAS enhancement appliance to intercept network packets originating by the clients and addressed to the original IP address of the NAS device;
   exporting a file system (fs) of the NAS device to the appliance;
   configuring a managed file system (mfs) on the appliance, the mfs corresponding to the exported fs, the exported fs becoming the mfs;
   configuring the appliance to forward non-fs-related intercepted network packets addressed to the original IP address of NAS device;
   configuring a proxy fs (pxfs) to process access to the exported fs and therefore to the mfs;
   configuring within the appliance a migration policy for the mfs, the migration policy specifying a target size of the mfs above which data is migrated away from the mfs;
   setting within the appliance a cache acceleration flag for the mfs indicating whether files of the mfs are to be cached by the appliance;
   configuring within the appliance a compression flag for the mfs indicating whether files of the mfs are to be compressed by the appliance; and
   causing the appliance to operate on the network in accordance with the mfs, the proxy fs, the migration policy, the cache acceleration flag, and the compression flag that have been configured,
   wherein the appliance interacts with the clients on behalf of the NAS device, the clients accessing the fs at the original IP address of the NAS device without reconfiguration of the clients, the appliance intercepting client access of the fs at the original IP address and instead processing the client access via the pxfs.

2. The method of claim 1, wherein the pxfs exports a mount point identical to a mount point of the mfs, the appliance taking the original IP address of the NAS device as a virtual IP address.

3. The method of claim 2, wherein the clients access files of the fs of the NAS device, and therefore of the mfs, via the appliance interacting with the pxfs.

4. The method of claim 1, further comprising:
   adding an entry in an mfs table of the appliance for the mfs, the entry for the mfs comprising:
      the original IP address of the NAS device;
      a mount point of the NAS device;
      the new IP address of the NAS device;
      an identifier referencing the migration policy;
      the cache acceleration flag; and
      the compression flag.

5. The method of claim 4, further comprising:
   defining a storage bin corresponding to an expansion storage drive connected to the network to which files of the mfs are expandable,
   wherein the entry for the mfs further comprises:
      identification of a storage bin corresponding to the expansion storage device,
   and wherein original data of each file expanded to the expansion storage device is stored on the NAS device, and additional data of each file expanded to the expansion storage device is stored on the expansion storage device.

6. The method of claim 4, further comprising:
   defining a storage bin corresponding to a migration storage device connected to the network to which files of the mfs are migratable,
   wherein the entry for the mfs further comprises:
      identification of the storage bin corresponding to the migration storage device connected,
   and wherein the files migrated to the migration storage device are completely stored on the migration storage device, and no part thereof is stored on the NAS device.

7. The method of claim 1, wherein causing the appliance to operate comprises, by the appliance:
   intercepting the network packets originating by the clients and addressed to the original IP address; and
   forwarding the non-fs-related intercepted network to the new IP address of the NAS device without modification.

8. The method of claim 7, wherein causing the appliance to operate further comprises, by the appliance:
   determining that an intercepted network packet pertains to a file on the fs of the NAS device and therefore to the mfs configured on the appliance; and
   controlling access to the file in accordance with the mfs, the proxy fs, the migration policy, the cache acceleration flag, and the compression flag that have been configured.

9. The method of claim 1, wherein causing the appliance to operate comprises, by the appliance:
   in response to determining that a current size of the mfs is greater than the target size of the mfs, selecting a plurality of files of the mfs in accordance with the migration policy;
   for each selected filed:
      chunking the selected file into a plurality of chunks, each chunk being a discrete file;
      moving the chunks of the selected file to a lower-performance NAS device communicatively connected to the network, the lower-performance NAS device having lower performance than the NAS device; and
      replacing the selected file on the mfs with a stub file indicating a location of the chunks of the selected file on the lower-performance NAS.

10. The method of claim 9, wherein causing the appliance to operate comprises, by the appliance:
   determining that an intercepted network packet pertains to a given selected file that has been migrated to the lower-performance NAS device;
   determining that the given selected file is to be de-migrated to a higher-performance NAS device, the higher-performance NAS device having higher performance than the lower-performance NAS device;
   moving the chunks of the given selected file from the lower-performance NAS device to the higher-performance NAS device; and
   updating the stub file on the mfs indicating the location of the chunks of the selected file on the higher-performance NAS device.

11. The method of claim 1, wherein causing the appliance to operate comprises, by the appliance:
   in response to determining that an intercepted network packet pertains to a file on the fs of the NAS device and therefore to the mfs configured on the appliance, in response to determining that the intercepted network packet is adding data to the file, and in response to determining that the mfs has reached capacity;
   chunking the file into a plurality of chunks, each chunk being a discrete file;
   storing the chunks of the selected file except for a last chunk of the file on the NAS device;
   storing the last chunk of the file, including the data added to the file, on an expansion storage device; and
   replacing the file on the mfs with a stub file indicating a location of the chunks of the file except the last chunk on the NAS device and a location of the last chunk of the file on the expansion storage device.

12. The method of claim 1, wherein causing the appliance to operate comprises, by the appliance:
   in response to determining that an intercepted network packet pertains to a file on the fs of the NAS device and therefore to the mfs configured on the appliance, and in response to determining that the cache acceleration flag has been set:
   chunking the file into a plurality of chunks, each chunk being a block; and
   storing the chunks of the file within a persistent storage of the appliance having a higher performance than the NAS device.

13. The method of claim 12, wherein causing the appliance to operate further comprises, by the appliance:
   in response to determining that the intercepted network packet pertains to reading a portion of the file,
   determining a selected chunk of the file to which the portion corresponds;
   retrieving the selected chunk from the persistent storage of the appliance; and
   returning the selected chunk in response to the intercepted network packet.

14. The method of claim 12, wherein causing the appliance to operate further comprises, by the appliance:
   in response to determining that the intercepted network packet pertains to altering a portion of the file,
   determining a selected chunk of the file to which the portion corresponds;
   altering the selected chunk of the file within the persistent storage of the appliance;
   setting a dirty bit corresponding to the selected chunk;
   at a later time, writing back the selected chunk to the file as stored on the NAS device.

15. The method of claim 1, wherein causing the appliance to operate comprises, by the appliance:
   in response to determining that an intercepted network packet pertains to a file on the fs of the NAS device and therefore to the mfs configured on the appliance, and in response to determining that the compression flag has been set:
   chunking the file into a plurality of chunks, each chunk being a block;
   compressing each chunk of the file individually;
   storing the chunks of the file on the NAS device;
   storing a mapping file on the NAS device referencing the chunks of the file;
   replacing the file on the mfs with a stub file indicating a location of the mapping file for the file.

16. A non-transitory computer-readable data storage medium storing computer-executable code that is executable by a processor to perform a method comprising:
   assigning a new Internet Protocol (IP) address to a network-attached storage(NAS) device connected to a network and currently storing data for a plurality of clients, the NAS device having an original IP address by which the clients access the data;
   configuring a NAS enhancement appliance to intercept network packets originating by the clients and addressed to the original IP address of the NAS device;
   exporting a file system (fs) of the NAS device to the appliance;
   configuring a managed file system (mfs) on the appliance, the mfs corresponding to the exported fs, the exported fs becoming the mfs;
   configuring the appliance to forward non-fs-related intercepted network packets addressed to the original IP address of NAS device;
   configuring a proxy fs (pxfs) to process access to the exported fs and therefore to the mfs;
   causing the appliance to operate on the network in accordance with the mfs and the proxy fs,
   wherein the appliance interacts with the clients on behalf of the NAS device, the clients accessing the fs at the original IP address of the NAS device without reconfiguration of the clients, the appliance intercepting client access of the fs at the original IP address and instead processing the client access via the pxfs.

17. The non-transitory computer-readable data storage medium of claim 16, wherein the method further comprises:
   configuring within the appliance a migration policy for the mfs, the migration policy specifying a target size of the mfs above which data is migrated away from the mfs; and
   defining a storage bin corresponding to a migration storage device connected to the network to which files of the mfs are migratable; and
   adding an entry in an mfs table of the appliance for the mfs, the entry for the mfs comprising:
   the original IP address of the NAS device;
   a mount point of the NAS device;
   the new IP address of the NAS device;
   an identifier referencing the migration policy; and
   identification of the storage bin corresponding to the migration storage device connected,
   wherein the files migrated to the migration storage device are completely stored on the migration storage device, and no part thereof is stored on the NAS device.

18. The non-transitory computer-readable data storage medium of claim 16, wherein the method further comprises:

defining a storage bin corresponding to an expansion storage drive connected to the network to which files of the mfs are expandable; and adding an entry in an mfs table of the appliance for the mfs, the entry for the mfs comprising:
the original IP address of the NAS device;
a mount point of the NAS device;
the new IP address of the NAS device;
identification of a storage bin corresponding to the expansion storage device, wherein original data of each file expanded to the expansion storage device is stored on the NAS device, and additional data of each file expanded to the expansion storage device is stored on the expansion storage device.

19. The non-transitory computer-readable data storage medium of claim 16, wherein the method further comprises:
setting within the appliance a cache acceleration flag for the mfs indicating whether files of the mfs are to be cached by the appliance; and
adding an entry in an mfs table of the appliance for the mfs, the entry for the mfs comprising:
the original IP address of the NAS device;
a mount point of the NAS device;
the new IP address of the NAS device;
the cache acceleration flag,
wherein causing the appliance to operate comprises, by the appliance:
in response to determining that an intercepted network packet pertains to a file on the fs of the NAS device and therefore to the mfs configured on the appliance, and in response to determining that the cache acceleration flag has been set:
chunking the file into a plurality of chunks, each chunk being a block; and
storing the chunks of the file within a persistent storage of the appliance having a higher performance than the NAS device.

20. The non-transitory computer-readable data storage medium of claim 16, wherein the method further comprises:
configuring within the appliance a compression flag for the mfs indicating whether files of the mfs are to be compressed by the appliance; and
adding an entry in an mfs table of the appliance for the mfs, the entry for the mfs comprising:
the original IP address of the NAS device;
a mount point of the NAS device;
the new IP address of the NAS device;
the compression flag,
wherein causing the appliance to operate comprises, by the appliance:
in response to determining that an intercepted network packet pertains to a file on the fs of the NAS device and therefore to the mfs configured on the appliance, and in response to determining that the compression flag has been set:
chunking the file into a plurality of chunks, each chunk being a block;
compressing each chunk of the file individually;
storing the chunks of the file on the NAS device;
storing a mapping file on the NAS device referencing the chunks of the file;
replacing the file on the mfs with a stub file indicating a location of the mapping file for the file.

\* \* \* \* \*